June 7, 1938.  F. W. MERRILL  2,120,109
INDUCTOR DYNAMO-ELECTRIC MACHINE
Filed July 22, 1936   3 Sheets-Sheet 1
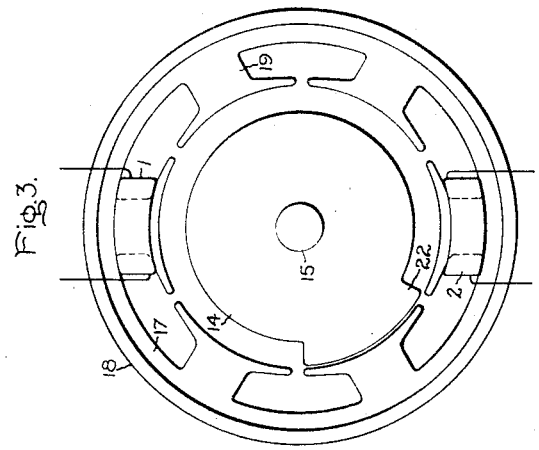
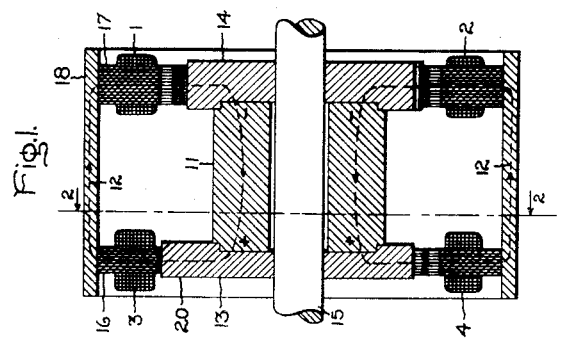
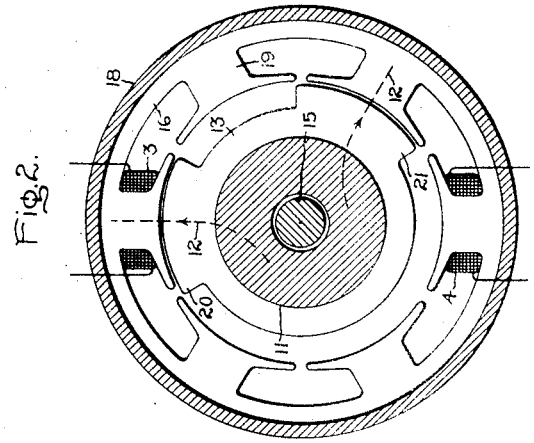
Inventor:
Frank W. Merrill,
by Harry E. Dunham
His Attorney.

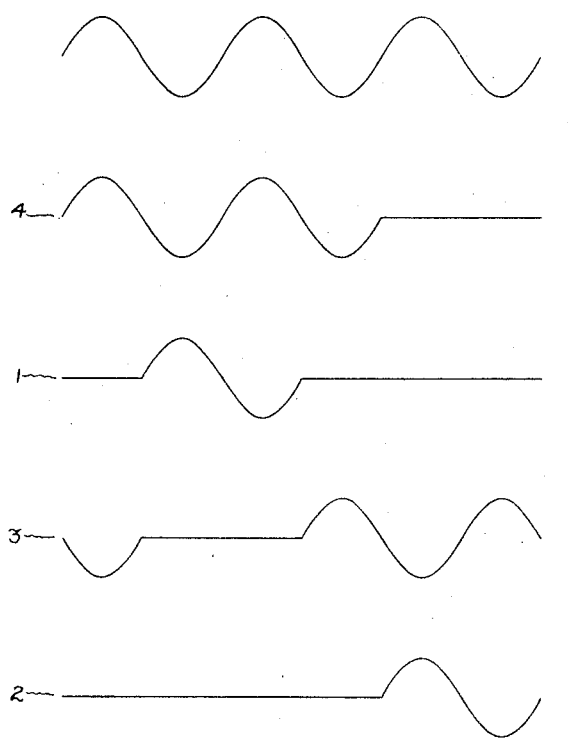
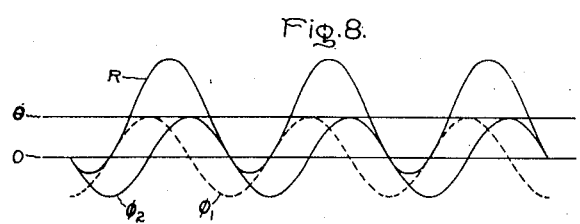

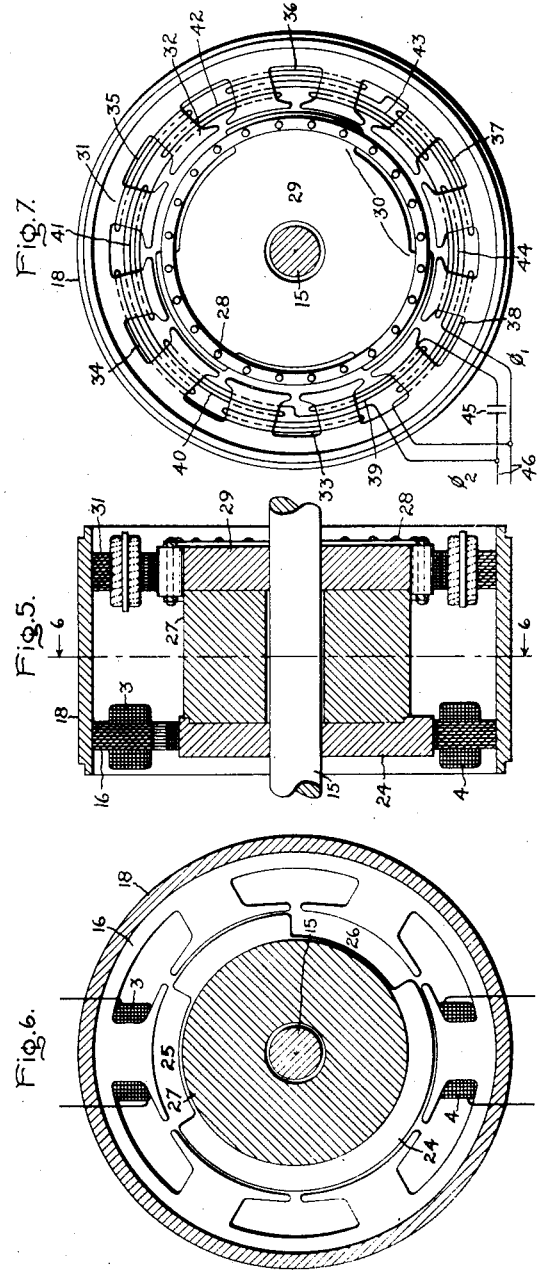

Patented June 7, 1938

2,120,109

UNITED STATES PATENT OFFICE 2,120,109

INDUCTOR DYNAMO-ELECTRIC MACHINE

Frank W. Merrill, Fort Wayne, Ind., assignor to General Electric Company, a corporation of New York Application July 22, 1936, Serial No. 91,924

8 Claims. (Cl. 171—209)

My invention relates to inductor type dynamo electric machines and one object is to provide a machine capable of generating alternating current of what may be termed interrupted frequency, for example, a 60 cycle current with every other cycle omitted or every other pair of cycles omitted. A further object of my invention is to provide a machine capable of generating more than one such interrupted cycle alternating current. The different currents generated having interruptions which differ from each other, which currents may then be combined to produce an alternating current of still a different character, for example, an alternating current of a different frequency, or special wave form. Such generators are useful for special purposes as for example controlling vacuum tube circuits supplying telephone ringing systems. A further object of my invention is to provide a pair of inductor dynamo electric machines having unidirectional flux excitation supplied by a common magnet. One of such machines may comprise a driving motor and the other a generator.

The features of my invention which are believed to be novel and patentable will be pointed out in the claims appended hereto. For a better understanding of my invention reference is made in the following description to the accompanying drawings in which Fig. 1 represents a sectional view of a pair of inductor generators having a common exciting magnet for producing four alternating currents of interrupted frequency. The four currents having interruptions which vary in character or time.

Fig. 2 is a sectional view taken on line 2—2 of Fig. 1; Fig. 3 is a right hand end view of the machine of Fig. 1. Fig. 4 illustrates by way of curves the character and sequence of the four interrupted cycle alternating currents produced by the machines of Fig. 1; Fig. 5 is a sectional view of an inductor motor generator set having a common permanent magnet excitation. Fig. 6 is a view of the generator of Fig. 5 taken on line 6—6 illustrating another way of generating the interrupted frequency current produced by the generator of Fig. 2. Fig. 7 is an end view of the inductor motor of Fig. 5 and Fig. 8 shows motor flux curves to be explained.

Referring now to Figs. 1, 2 and 3, Fig. 1 shows a section through the axis of a special form of inductor generator having a generating unit at either end, both units being supplied with unidirectional excitation by a common permanent magnet 11 on the rotor and polarized to produce a unidirectional flux through both generating units as indicated generally by dotted lines 12.

The permanent magnet 11 is polarized axially as indicated by the (+) and (—) signs thereon. Such a magnet suitable for my purposes can be made in the form shown by using a high coercive force material, such, for example, as that described in United States Letters Patent No. 1,968,569, Ruder, July 31, 1934. The magnet is a casting and it is only necessary to grind the end surfaces which abut against the central or yoke portions of the rotor elements 13 and 14. These rotor elements may be made of solid iron since they carry a constant unidirectional flux although it may be desirable to make them out of stacked up punchings for ease in manufacture.

The rotor parts are carried by the shaft 15 which should be made of non-magnetic material to prevent shunting the permanent magnet 11. The two stator elements 16 and 17 are secured opposite the rotor elements in a magnetic shell framework 18. The stator elements 16 and 17 will be of laminated magnetic material and have salient pole pieces 19 facing their rotors as shown in Figs. 2 and 3. In this case six uniformly spaced salient stator pole pieces are used. Certain of these pole pieces are provided with alternating current generating coils which for convenience are numbered 1, 2, 3 and 4. Rotor 13 has two polar salients 20 and 21 spaced two stator poles apart. Rotor 14 is different in that it has one polar salient 22. These rotor salients have a peripheral length of 60 degrees. I prefer to make the stator 17 and rotor 14 somewhat thicker than stator 16 and rotor 13 in order to partially or fully equalize the flux density in the active pole pieces as it will be evident that the flux of pole piece 22 of rotor 14 and the adjacent stator pole piece must carry substantially all of the flux that flows through pole pieces 20 and 21 of rotor 13 and the adjacent stator pole pieces in parallel. Also, if the A. C. means generated in coils 3 and 4 are to be of the same magnitude as the A. C. currents to be generated in coils 1 and 2, the latter coils will have a fewer number of turns than those on stator 16 because the generating flux per pole in stator 16 is only half of the generating flux per pole in stator 17. It is further noted that the rotor pole 22 is on the opposite side of the rotor shaft from rotor poles 20 and 21, considered as one, to maintain static balance. If this does not sufficiently balance the rotor, additional balancing weights of non-magnetic material may be added at the proper points to obtain dynamic balance.

In Fig. 4 I have represented at 4, 1, 3 and 2 the discontinuous voltage waves that are produced in the corresponding numbered coils of Figs. 2 and 3 during a complete revolution of the rotor when the machine is driven at a uniform speed. The horizontal displacement of these waves towards the right also corresponds to the time displacement thereof when clockwise rotation (Figs. 2 and 3) is assumed. Above this group of curves is a continuous sine wave such as would be produced in a normal six pole single phase alternating current generator when driven at the same speed. If 1200 R. P. M. be assumed the top curve would be a 60 cycle wave. The curves are plotted on the assumption that the machine is up to speed and we begin plotting when the rotor is in the position shown in Figs. 2 and 3. During the first 1/6th revolution rotor pole 20 moves from under coil 3 and rotor pole 21 moves under coil 4. Thus a positive half cycle wave will be generated in coil 4 and a negative half cycle wave will be generated in coil 3. No change in flux occurs through coils 1 and 2 during the first 1/6 revolution so the voltage in these coils remains at zero value.

During the second 1/6 revolution rotor pole 21 moves from under coil 4 and produces a negative half cycle therein. Rotor pole 22 also moves under coil 1 and produces a positive half cycle therein. There is no change in flux through coils 2 and 3 and their voltages remain at zero.

During the third 1/6 revolution of the rotor, rotor pole 20 moves under coil 4 and produces a positive 1/2 cycle, and rotor pole 22 moves from under coil 1 and produces a negative half cycle.

Proceeding in the same way for the 4th, 5th and 6th parts of the complete rotation, it will be seen that the voltages of the different coils will vary as shown by the plotted curves.

It is seen that coils 3 and 4 will produce alternating current in which every third cycle is missing and that coils 1 and 2 will produce alternating currents in which two cycles out of every three are missing.

It may be stated that any voltage wave may legitimately be shown just the reverse from that illustrated since the effect of this may be accomplished in practice by simply reversing the leads to the corresponding coil.

Also, it is evident that I may shift any curve to the right or the left by one or more half cycles by shifting the corresponding stator coil one or more stator pole pieces in the required direction.

I may connect coils 1 and 4 in series and cancel out the middle complete cycle of curve 4 to produce a wave of alternate polarity half cycles spaced apart in time by a complete cyclic period.

Additional coils may be added to one or more of the bare stator poles to obtain further curves of the same character represented but spaced in time, and I may combine these curves in various ways to produce a wide variety of results.

In the drawings, the stator pole pieces in the two stator parts are shown as assembled in axial alignment but this is not essential and by shifting one set of stator pole pieces by less than a pole pitch still further variation can be obtained. It is desirable, however, that all of the six stator pole pieces be present in each stator element, even though not all of them are wound with coils, in order to maintain a substantially uniform reluctance path for the permanent magnet flux in different rotor positions and to prevent pulsation of flux in the rotor salients and in the permanent magnet.

In Fig. 1, it is seen that two inductor generators are supplied by the same permanent magnet. This arrangement allows of an economical use of materials with a minimum of reluctance in the permanent magnet flux circuit. In Figs. 5, 6 and 7 I have shown the same advantageous arrangement of permanent magnet excitation where one machine is a generator and the other its driving motor.

The stator 16 of the generator (Fig. 6) and the magnetic shell 18 between the stator elements of motor and generator will be the same as in the machine of Figs. 1 and 2 and are thus indicated by like reference characters. The rotor 24 of the generator in Fig. 6 accomplishes the same result as the rotor 13 in Fig. 2, but by a different arrangement of polar salients. The polar salients and inter-salients of rotors 13, Fig. 2, and rotor 24, Fig. 6 are just the reverse, that is, where salient poles 20 and 21 are provided in Fig. 2 I have shown inter-salient, 25 and 26 in Fig. 6. It will be evident that this arrangement will produce the same relative flux changes in coils 3 and 4, Fig. 6, as are produced in Fig. 2 and generate interrupted cycle alternating currents in coils 3 and 4 of the same character and time spacing as shown in curves 3 and 4, Fig. 4. The flux path area between stator and rotor is, however, twice as great in Fig. 6 and this is desirable because of the greater excitation requirements of the driving motor shown in Fig. 7 with which the generator is combined in a motor generator set. For the same reason, the permanent magnet 27, Fig. 5, is made somewhat larger in relative diameter than in Fig. 2.

At the right in Fig. 5 and in Fig. 7 I have shown an inductor motor which is provided with a squirrel cage winding 28 on the rotor to give good starting torque and with a 2 phase stator energizing winding to produce rotation in a predetermined direction of rotation. The novel features pertaining to such squirrel cage inductor motors per se are claimed in my application (Serial No. 91,923) filed concurrently herewith and assigned to the same assignee as the present invention. The magnetic material of the rotor 29 may be solid and is somewhat thicker than the rotor iron 24 of the generator because of flux density requirements at its pole pieces. It will be noted that the motor rotor has three uniformly spaced pole pieces 30 which together occupy 1/2 the rotor circumference which is somewhat less than the flux carrying rotor circumference of the generator, with which it is associated in the permanent magnet flux path. The flux from the permanent magnet 27 supplies the D. C. excitation of both motor and generator and passes through their stators and the magnetic connecting shell 18 in series as in the two generators of Fig. 2. If we assume that the generators of Figs. 2 and 6 have the same generating capacities it will be seen that the generator of Fig. 6 requires a greater permanent magnet flux excitation because of the greater peripheral polar area of its rotor, so that where we combine two generators as in Fig. 2 with the same exciting permanent magnet, it will be more economical to use the smaller permanent magnet there shown. However, when we combine such a generator with its driving motor and use the same permanent magnet excitation, it is preferable to use the form of generator rotor shown in Fig. 6 and a relatively larger permanent magnet because we need the extra permanent magnet flux for the driving motor not only because of its rotor polar relation above mentioned, but for other reasons which will presently be explained.

The stator 31 of the motor is of laminated magnetic material having an axial thickness somewhat greater than that of the generator. It is provided with twelve uniformly spaced pole pieces 32 such that a rotor salient pole 30 spans two stator poles. The stator is provided with a six pole 2 phase winding and will, therefore, have a speed of 1200 R. P. M. on 60 cycles which is a speed sufficiently high to obtain effective induction motor starting action in this motor which runs synchronously as an inductor motor. Thus while the stator has twelve pole pieces it should be borne in mind that it has only six A. C. magnetic poles. $\phi_2$ coils are numbered 33 to 38 inclusive and $\phi_1$ coils are numbered from 39 to 44 inclusive. The odd numbered coils may be considered positive.

In designing a self-starting inductor motor certain precautions are necessary. In the first place the permanent magnet flux should not produce any appreciable locking tendency at standstill. Locking at standstill due to the permanent magnet flux is avoided if the air gap reluctance to such flux is constant in all rotor positions. It is evident that this is true of the motor shown because a rotor pole will span exactly the area of two stator poles in any position.

It is also essential to efficient starting and operation that the permanent magnet flux induce no current in the squirrel cage winding at any time as this would produce damping torque and useless losses. It is seen that while the permanent magnet flux does pass through the squirrel cage winding this flux is constant and in one direction and does not shift with respect to the squirrel cage and, therefore, induces no detrimental currents therein. The rotating A. C. field, however, does cut the squirrel cage at any speed less than synchronous and thus effective starting torque is obtained.

Not only is it important that the permanent magnet or D. C. flux requirements for the motor and generator be properly proportioned but it is also important that the A. C. and D. C. fluxes of the motor be properly proportioned. The reason for this will now be explained in connection with the motor flux relations which occur during synchronous operation and which are pictured in Fig. 8.

The zero flux line is represented by 0. $\phi_1$ represents the $\phi_1$ flux, $\phi_2$ the $\phi_2$ flux, $\theta$ the D. C. flux which is constant and in one direction and R the resultant of the A. C. and D. C. fluxes at any instant. It is seen that if the D. C. flux be made approximately equal to the maximum flux per A. C. coil as shown that the resultant flux curve R is almost completely to one side of the zero flux line and produces in effect a unidirectional or homopolar three pole resultant flux field having a spacing corresponding to the three rotor polar salients. This resultant field, of course, revolves at 1200 R. P. M. assuming 60 cycle A. C. supply and locks the rotor in synchronism therewith at that speed. If the D. C. flux were reduced the resultant homopolar three pole flux field would become more and more like the alternating six pole field that would result if no D. C. flux were present.

It is seen then that the A. C. and D. C. fluxes in the motor should be so proportioned to obtain the best resultant three pole rotating magnetic field. The rotation will be clockwise in Fig. 7 where, as indicated, $\phi_1$ leads $\phi_2$ by 90 degrees. 45 represents a condenser in the $\phi_1$ circuit for this purpose and 46 a single phase source of supply. The direction of rotation may be reversed by shifting the condenser from $\phi_1$ to $\phi_2$.

From the foregoing explanation it is seen that when a permanent magnet or its equivalent is employed to supply the excitation for a pair of inductor type dynamo electric machines, the flux requirements of the machine should be properly proportioned to each other and to the permanent magnet and that this requirement is more exacting when one of the machines is a motor and the other a generator. The flux proportion requirements herein indicated will not necessarily be best for a different design of motor or generator and I do not wish to limit my invention in this respect.

What I claim as new and desire to secure by Letters Patent of the United States is:

1. An inductor dynamo machine unit comprising, a pair of inductor machines each having cooperating stator and rotor elements, said stator and rotor parts being placed side by side with the rotors on the same axis, said stator elements being formed of laminated magnetic material and being provided with alternating-current windings, said rotor elements being formed of magnetic material and having polar salients, a magnetic connection between the outer peripheries of said stator parts and a magnetic connection between the inner portions of said rotor parts, one of said magnetic connections including an annular permanent magnet for producing a homopolar unidirectional flux in series between the stator and rotor parts of both machines, the active flux path between stator and rotor measured in a peripheral direction at the air gap being materially greater in one machine than in the other machine, and the axial dimensions of the magnetic pole portions of said machines being different to the extent and in a direction to make the active flux path area between stator and rotor in both machines substantially the same.

2. An inductor dynamo machine unit comprising, a pair of inductor type dynamo-electric machines each having cooperating stator and rotor parts, the machines being placed side by side with their rotor parts mounted on the same shaft, the stator parts having laminated magnetic circuits provided with alternating-current windings thereon, the rotor parts comprising magnetic core portions provided with peripheral polar salients, magnetic connections between the outer peripheral portions of the stators and magnetic connections between the inner core portions of the rotors, said magnetic connections including means for producing a unidirectional flux through said connections and between the stator and rotor parts of each machine in series, the percentages of the peripheral air gaps of said machines effective to carry flux between stator and rotor being different in the two machines, and other dimensional relations of said machines, effecting the air gap flux density, being made different by an amount and in a direction to make the effective flux-carrying magnetic air gap area between the stator and rotor parts of both machines approximately equal.

3. In combination, a pair of inductor type dynamo-electric machines having salient pole magnetic stator elements arranged side by side and salient pole magnetic rotor elements cooperating with said stator elements and mounted on the same shaft, the salient pole arrangement of the two machines being different such that the peripheral length of the flux path between the salient poles of stator and rotor of one machine is different from the peripheral length of the flux path between the salient poles of the stator and rotor of the other machine, the axial width of the salient poles in the two machines also being different to the extent necessary for making the salient pole flux path area of both machines approximately equal, a magnetic connection between the yoke portions of the stators, and another magnetic connection between the yoke portions of the rotors of said machines, said magnetic connections being axially symmetrical and one of said magnetic connections comprising a permanent magnet for supplying homopolar unidirectional flux excitation serially between the stators and rotors of both machines.

4. In combination, a pair of inductor type dynamo-electric generators having salient magnetic pole stator and rotor elements, the stator elements having their yoke portions enclosed by a common magnetic shell, the rotor elements being mounted on a common nonmagnetic shaft, and an annular permanent magnet surrounding the shaft and having its magnetic poles abutting against the yoke portions of said rotor elements for the purpose of supplying homopolar unidirectional flux excitation for both machines, said machines having uniformly spaced salient stator poles with alternating-current generating coils on only a portion of said salient poles, the salient pole arrangement of the rotors being such as to produce an interrupted frequency alternating current in said coils when the rotors are rotated.

5. An alternating-current inductor generator for producing interrupted frequency alternating current comprising, a stator having a plurality of uniformly spaced salient magnetic poles, a rotor of magnetic material cooperating therewith having a salient pole number less than half the number of stator salient poles, a rotor salient pole being of the same peripheral dimension as a stator salient pole, and means for producing homopolar unidirectional excitation between stator and rotor.

6. An alternating-current generator of the inductor type for producing an interrupted frequency alternating current comprising, a stator with a plurality of evenly spaced magnetic pole pieces, a coil on one of said pole pieces, a rotor of magnetic material cooperating with said stator, and means for producing a homopolar unidirectional flux between stator and rotor, said rotor having salient and intersalient portions in its periphery of such spacing and dimensions as to produce the desired interrupted frequency alternating current in said stator coil when the rotor is rotated at a uniform speed, said machine having a uniform air gap reluctance in all rotor positions by reason of the evenly spaced stator magnetic poles.

7. An alternating-current generator comprising, a stator having uniformly spaced salient magnetic pole pieces, an alternating-current generating coil on one of said pole pieces, a magnetic rotor, and means for producing a unidirectional flux between stator and rotor, said rotor having irregular salient and intersalient portions on its periphery such that, when the rotor is driven at uniform speed, an interrupted frequency alternating-current voltage is generated in the stator coil of said one pole piece, the remaining stator pole pieces serving with said rotor to maintain a uniform reluctance between stator and rotor in all rotor positions.

8. In combination, a pair of inductor generators each having cooperating salient magnetic pole stator and rotor elements, the machines being placed side by side, a common shaft on which the rotors are mounted, the stators each having uniformly spaced salient poles and the rotors having a salient pole arrangement which is different than the pole spacing of their respective stators and which is different in the two rotors, means for producing homopolar unidirectional flux excitation between the stators and rotors of each machine in series relation, and generating coils on a portion of the stator pole pieces of each machine, the salient poles of the rotors being non-uniformly disposed about the rotors so as to produce interrupted frequency alternating currents in the corresponding stator coils but such as to maintain a substantially uniform reluctance between the stators and rotors of each machine with respect to the unidirectional flux in all rotor positions.

FRANK W. MERRILL.

CERTIFICATE OF CORRECTION.

Patent No. 2,120,109.     June 7, 1938.

FRANK W. MERRILL.

It is hereby certified that error appears in the printed specification of the above numbered patent requiring correction as follows: Page 1, second column, line 44, for the word "means" read currents; and that the said Letters Patent should be read with this correction therein that the same may conform to the record of the case in the Patent Office.

Signed and sealed this 12th day of July, A. D. 1938.

Henry Van Arsdale,
Acting Commissioner of Patents.

(Seal)